United States Patent
Milne et al.

(10) Patent No.: US 6,711,660 B1
(45) Date of Patent: Mar. 23, 2004

(54) SYSTEM AND METHOD FOR PERFORMING DISK DRIVE DIAGNOSTICS AND RESTORATION USING A HOST-INACCESSIBLE HIDDEN PARTITION

(75) Inventors: Matthew W. Milne, Chino, CA (US); Vu L. Luu, Milpitas, CA (US); Xuejian Fu, Fremont, CA (US); Michael S. Rothberg, Foothill Ranch, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 51 days.

(21) Appl. No.: 09/888,107

(22) Filed: Jun. 22, 2001

(51) Int. Cl.[7] ............................................... G06F 12/08
(52) U.S. Cl. .......................... 711/173; 714/6; 714/306; 713/2
(58) Field of Search .............................. 711/173; 714/6, 714/36; 713/2

(56) References Cited

U.S. PATENT DOCUMENTS 5,966,732 A    10/1999    Assaf
2002/0188837 A1 * 12/2002  Dayan et al. ................... 713/2

OTHER PUBLICATIONS

James Mohr, "LILO– The Linux Loader", Copyright 1994–2002, www.linux–tutorial.info.*
Theresa Hadden Martinez, LPIC Prep Kit 101 General Linux, copyright 2000, Chapter 2.*
Address Offset Reserved Area Boot Method, T13/1407DT Revision 5, ANSI, Oct. 24, 2000, pp. i–iv and 1–6.
Protected Area Run Time Interface Extension Services, T13/1367D Revision 3, ANSI, Sep. 30, 2000, pp. i–v and 1–19.
Image Cast MFG 4.5, Dec. 2000, Storage Soft, Inc., pp. 3–9.
Area 51, StorageSoft Inc., 3 pages.

* cited by examiner

*Primary Examiner*—Reginald G. Bragdon
*Assistant Examiner*—Midys Inoa
(74) *Attorney, Agent, or Firm*—Won Tae C. Kim, Esq.; Milad G. Shara, Esq.; Stetina Brunda Garred & Brucker (57) ABSTRACT

A system and method for performing disk drive diagnostics and restoration using a host-inaccessible partition are disclosed. The system includes a disk drive including: a host-accessible user partition; a host-inaccessible hidden partition independent of the host-accessible user partition; and a disk controller. The user partition includes: a user partition address range; a host-selected operating system; and a host-selected master boot record. The host-inaccessible hidden partition includes: a hidden partition address range outside the user partition address range; diagnostic software for determining a condition of the computer system; and a drive-selected master boot record for waiting for a user input; if the user input is received within a predetermined time period: loading and executing the diagnostic software; and if the user input is not received within the predetermined time period: loading the host-selected master boot record; and loading and executing the host-selected operating system identified by the host-selected master boot record.

22 Claims, 9 Drawing Sheets

SYSTEM AND METHOD FOR PERFORMING DISK DRIVE DIAGNOSTICS AND RESTORATION USING A HOST-INACCESSIBLE HIDDEN PARTITION

BACKGROUND OF THE INVENTION

Field of the Invention

The present invention relates generally to digital information storage, and more particularly to a computer system and method for performing disk drive diagnostics and restoration using a host-inaccessible hidden partition.

Description of the Prior Art

A small percentage of computer users may encounter a situation where an error message is displayed when attempting to boot the computer from a hard disk drive. Despite the small percentage of these occurrences, the huge numbers of installed personal computer makes the actual number of boot error occurrences significant. In many of these instances, the user calls for technical support from the system manufacturer. Technical support staff may attempt to diagnose the problem by having the user load a diagnostic program or recovery program from a floppy disk or CD ROM, however many users are unable to locate the disks provided with the system.

In most boot error situations the problem is either a corrupted image on the disk drive or, more infrequently, a failing hard disk drive. Because the situation is undiagnosed when the user cannot locate system disks, technical support staff usually advises the user to send the disk drive back for exchange. As a result, many fully working disk drives are returned and exchanged for new ones, causing unnecessary expense for the manufacturers of computers and disk drives.

The industry has attempted to alleviate this problem by creating partitions on the disk drive to store recovery software. In one variation, a separate logical partition is created using conventional partition tables. In another more recent attempt, a "host protected area" is created by issuing commands to the disk drive for truncating the range of logical block addresses (LBAs) that are visible to the operating system. Unfortunately, this truncating method is well documented in the AT Attachment (ATA) specifications for disk drive interface and therefore, the partition thus created can be easily corrupted by a virus or other malicious programs.

What is needed therefore, is a solution to the boot error problem that doesn't depend on a user locating removable media which is subject to loss or misplacement and which cannot easily be corrupted by a virus or other malicious programs.

SUMMARY OF THE INVENTION

One embodiment of the invention comprises a disk drive for use with a computer system including a host memory and a host processor for generating a boot command. The disk drive comprises: a host-accessible user partition; a host-inaccessible hidden partition independent of the host-accessible user partition; and a disk controller. The host-accessible user partition includes a user partition address range; a host-selected operating system within the user partition address range; and a host-selected master boot record within the user partition address range, the host-selected master boot record identifying the host-selected operating system. The host-inaccessible hidden partition includes: a hidden partition address range outside the user partition address range; diagnostic software within the hidden partition address range, the diagnostic software for determining a condition of the computer system; and a drive-selected master boot record within the hidden partition address range. The drive selected master boot record waits for a user input within a predetermined time period. If the user input is received within the predetermined time period, the master boot record loads and executes the diagnostic software. If the user input is not received within the predetermined time period, the master boot record loads the host-selected master boot record and loads and executes the host-selected operating system identified by the host-selected master boot record. The disk controller receives the boot command and sends the drive-selected master boot record to the host memory in response to the boot command.

Another embodiment of the invention comprises a computer system including: a disk drive and a host computer coupled to the disk drive. The disk drive includes: a host-accessible user partition; and a host-inaccessible hidden partition independent of the host-accessible user partition. The host-accessible user partition includes: a user partition address range; a host-selected operating system within the user partition address range; and a host-selected master boot record within the user partition address range, the host-selected master boot record identifying the host-selected operating system. The host-inaccessible hidden partition includes: a hidden partition address range outside the user partition address range; diagnostic software within the hidden partition address range, the diagnostic software for determining a condition of the computer system; and a drive-selected master boot record within the hidden partition address range. The host computer includes: a host processor for generating a boot command to read the host-selected master boot record; and a host memory for loading the drive-selected master boot record to define a loaded drive-selected master boot record. After the disk drive receives the boot command, the host processor executes the loaded drive-selected master boot record by waiting for a user input within a predetermined time period. If the user input is received within the predetermined time period, the host processor loads and executes the diagnostic software. If the user input is not received within the predetermined time period, the host processor loads the host-selected master boot record and loads and executes the host-selected operating system identified by the host-selected master boot record.

Another embodiment of the invention comprises a computer system including: a host computer; and a disk drive coupled to the host computer. The disk drive comprises: a host-accessible user partition and a host-inaccessible hidden partition independent of the host-accessible user partition. The host-accessible user partition includes: a user partition address range; and user partition data within the user partition address range, the user partition data comprising at least one host-selected operating system and configuration data. The host-inaccessible hidden partition includes: a hidden partition address range outside the user partition address range; a drive-selected operating system within the hidden partition address range; a drive-selected master boot record within the hidden partition address range, the drive-selected master boot record for loading the drive-selected operating system; and restorable user partition data within the hidden partition address range, the restorable user partition data comprising a copy of the user partition data, the restorable user partition data for restoring the user partition data.

Another embodiment of the invention comprises a method of restoring a user system image on a disk drive for use with a computer system including a host processor for generating a boot command and a host memory. The method comprises:

loading user partition data comprising at least one host-selected operating system and configuration data on a host-accessible user partition of the disk drive; and loading a restorable user system image comprising the user partition data on a host-inaccessible hidden partition of the disk drive.

BRIEF DESCRIPTION OF THE DRAWINGS

The accompanying drawings illustrate embodiments of the present invention, and, together with the description, serve to explain the principles of the invention.

DESCRIPTION OF THE PREFERRED EMBODIMENTS

U.S. patent application Ser. No. 09/796,915, filed Feb. 28, 2001, titled "COMPUTER SYSTEM AND METHOD FOR ACCESSING A PROTECTED PARTITION OF A DISK DRIVE THAT LIES BEYOND A LIMITED ADDRESS RANGE OF A HOST COMPUTER," the entire contents of which are incorporated herein by reference, discloses a computer system having a host computer coupled to a disk drive having a user partition and a hidden partition and a system and method for accessing the hidden partition. As shown in the drawings and explained in further detail herein, the present invention stores a user system image in the hidden partition. Diagnostic software is also stored in the hidden partition. The user can execute the diagnostic software in the hidden partition and/or restore the user system image stored in the hidden partition.

Figure 1:
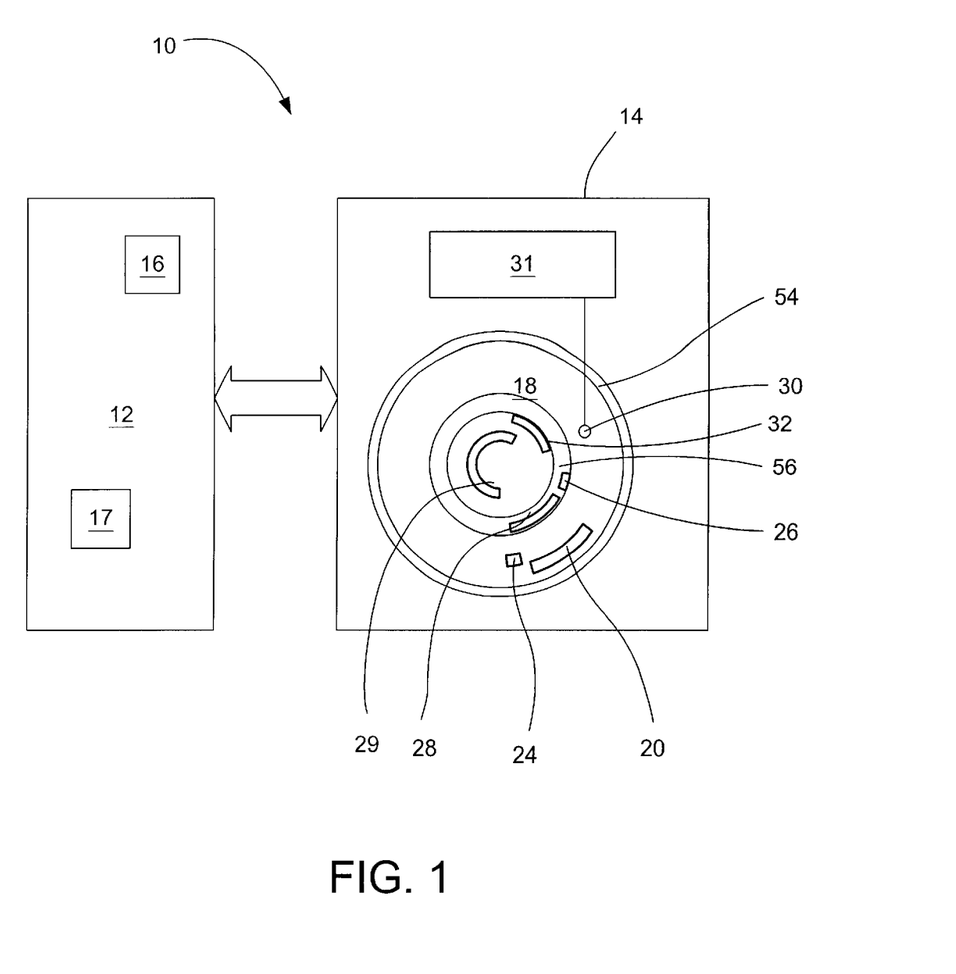
FIG. 1 is a block diagram of a computer system, having a host computer coupled to a disk drive having a hidden partition for storing a restorable user system image and diagnostic software.
Figure 2:
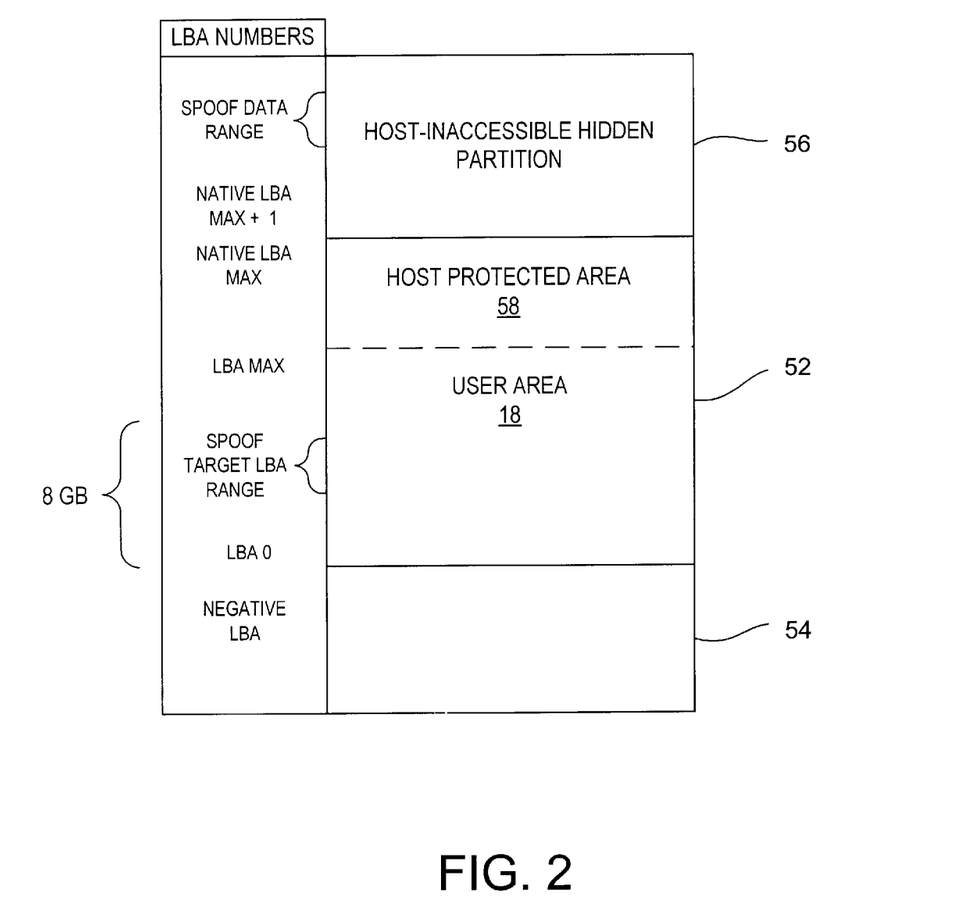
FIG. 2 is a block diagram illustrating the organization of data storage sectors in the disk drive of FIG. 1.

The present invention may be embodied in a computer system (FIG. 1) and a related method (FIGS. 4–8). The computer system 10 includes a host computer 12 and a disk drive 14. The host computer 12 has a host processor 16 and a host memory 17. The disk media of the disk drive 14 is accessed using a head assembly 30 and may be divided into data storage sectors, each generally storing 512 data bytes. Each sector may be addressed using a logical block address (LBAs). A linear addressing scheme using the LBAs for addressing the sectors is shown in FIG. 2. The data storage sectors are organized into a host-accessible user partition 52, a drive management partition 54, and a protected area also referred to herein as a disk-drive selected application partition (DDSAP) or a host-inaccessible hidden partition 56. The user partition 52 includes a user area 18 and may be assigned to LBA numbers 0 through a native maximum (MAX) LBA. The host computer 12 may access the data storage sectors in the user partition 52 using an industry standard interface protocol, such as the ATA Interface between host computers and storage devices. The ATA standard also defines a host protected area 58 within the user partition 52 for data storage outside the normal file system of the user's preferred operating system 20. The operating system cannot change data in the host-protected area 58. A host-selected master boot record (MBR) 24 includes a small program for loading and executing the user's preferred or host-selected operating system 20. The host-protected area 58 is intended for use only by the host computer's basic input/output system (BIOS) or other low-level boot time process when the storage device is initially configured.

The drive management partition 54 may be assigned to negative LBA numbers and the corresponding data storage sectors may be accessed using drive management commands. The data in the drive management partition 54 generally includes disk drive configuration and physical format information written by the disk-drive manufacturer during initial testing and configuration of the disk drive 14. The drive management commands generally vary from manufacturer to manufacturer.

DDSAP 56 is assigned to "spare" data storage sectors above the native MAX LBA number. It will be appreciated that the DDSAP could be assigned to negative LBA numbers instead of or in addition to storage sectors above the native MAX LBA number. Generally, the DDSAP is configured by the disk drive manufacturer before shipment of the disk drive 14. The DDSAP sectors are visible to the disk drive's microprocessor-based internal controller 31 (FIG. 1) but normally are not visible to the host computer 12. Accordingly, data stored in the DDSAP may not be destroyed by logical partitioning and formatting processes (e.g., FDISK) performed on the user partition 52. Typically, the DDSAP includes at least one drive-selected master boot record 26, at least one extended disk access routine 28 and at least one interrupt routine or application 29. In the present invention, the DDSAP delivered by the disk drive manufacturer includes applications 29 for waiting for a user input that allows the user to run the diagnostics and/or restore a user system image, as well as applications for running the diagnostics and restoring a user system image. A drive-selected master boot record 26 causes the logic to wait for the user input to be loaded and executed. The DDSAP delivered by the disk drive manufacturer also includes an application 29 that allows a computer manufacturer to load a restorable user system image 32 into the DDSAP.

Figure 3:
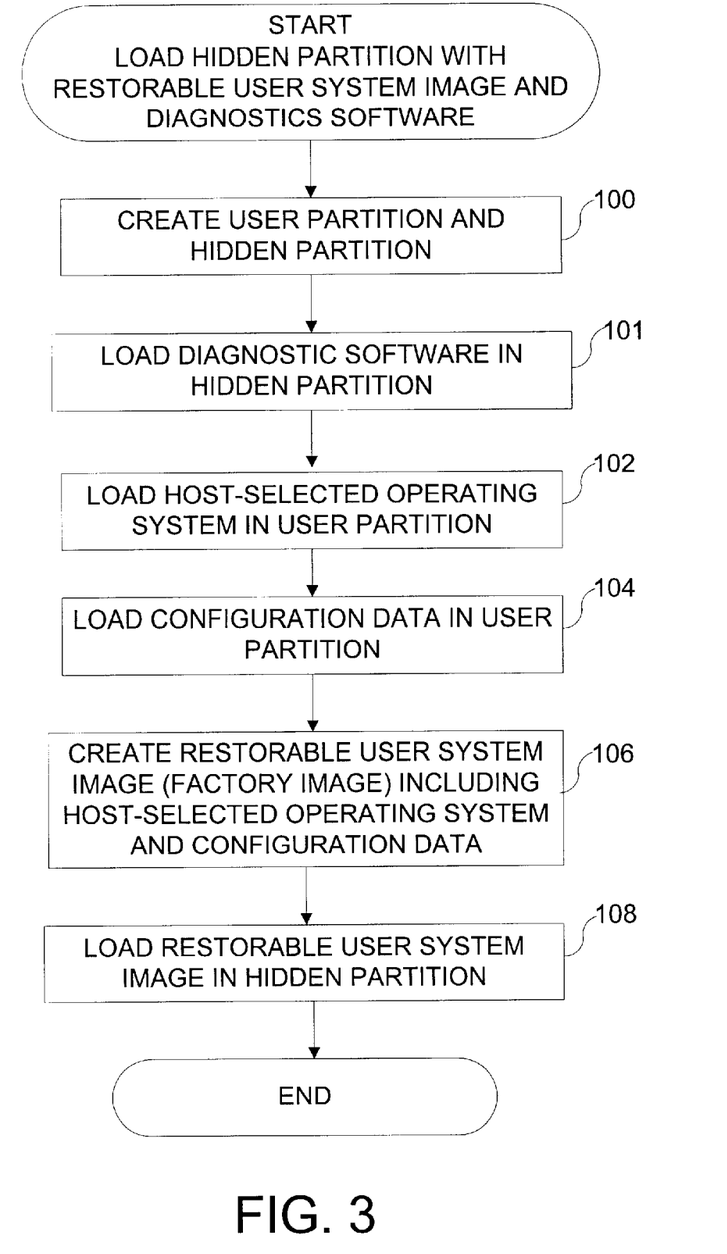
FIG. 3 is a flow diagram illustrating exemplary logic for loading a user system image and diagnostics software in the hidden partition of the disk drive of FIG. 1.

FIG. 3 is a flow diagram illustrating exemplary logic for loading a restorable user system image and diagnostics software in the hidden partition 22. A user partition 52 and hidden partition 56 are created as shown in FIG. 2 (step 100). Diagnostic software is stored in the hidden partition 56 (step 101). A user preferred operating system, also known herein as a host-selected operating system, is loaded in the user area of the user partition 18 (step 102). Configuration data is also loaded in the user area 18 (step 104). Configuration data includes data specific to the computer system components and/or the host-selected operating system. A restorable user system image that includes the host-selected operating system and the configuration data (factory image) is created (step 106). The restorable user system image is loaded in the hidden partition 56 (step 108). Typically, the disk drive manufacturer performs the steps of creating the user partition and the hidden partition (step 100) and loading the diagnostic software in the hidden partition (step 101). The hidden partition delivered by the disk drive manufacturer includes application software that allows the computer system manufacturer to perform the remaining logic in FIG. 3, e.g., creating and loading a restorable user system image (steps 106 and 108). After the logic of FIG. 3 has been performed, the computer system is ready to be delivered to a consumer or user. Use of the computer system 10 having diagnostics and a restorable user system image in a hidden partition 56 is described next.

From the user's perspective, the delivered system is basically the same as any typical computer system. When the user powers on the computer system, the computer typically loads and executes the user's preferred operating system. However, as shown in the drawings and described in further detail below, at the beginning of the boot process, there is a short time window in which the user can load and execute PC Services rather than the user's preferred operating system. The PC Services allow the user to load and execute diagnostic software and/or to restore the user system image.

Figure 4:
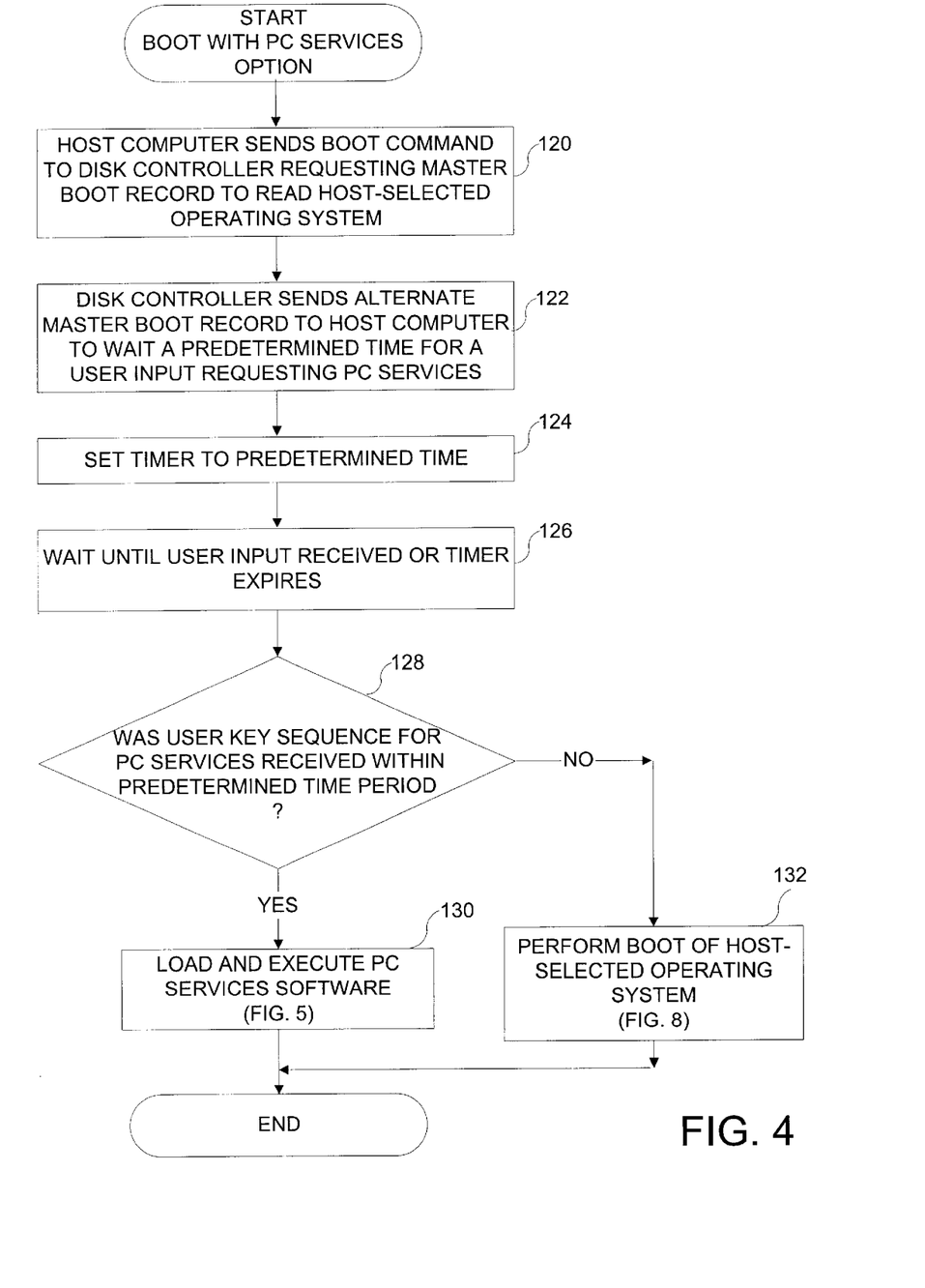
FIG. 4 is a flow diagram illustrating exemplary logic for booting a computer such that a user can load and execute PC Services software for performing diagnostics and/or restoring a user system image in accordance with the present invention.
Figure 5:
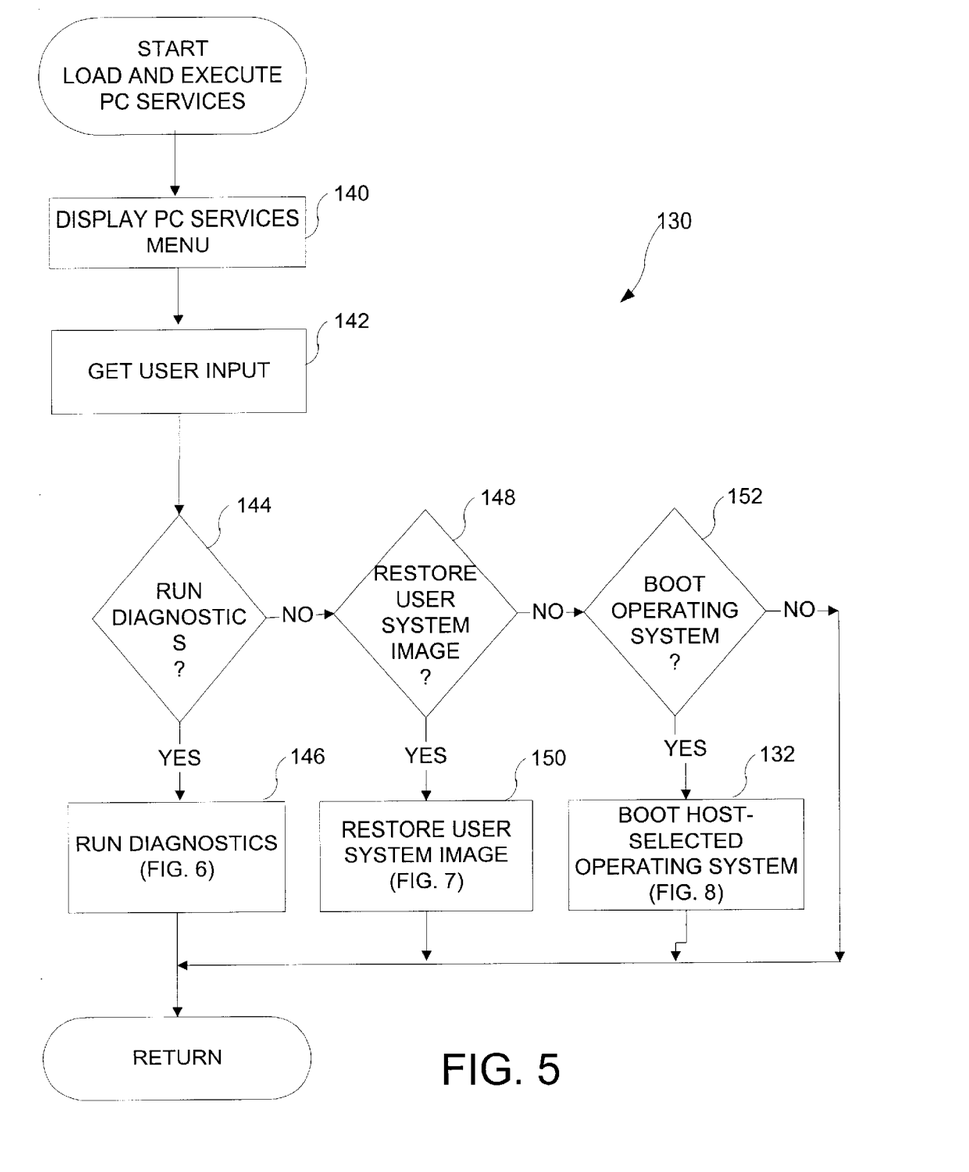
FIG. 5. is a flow diagram illustrating exemplary logic for load loading and executing PC Services software that allows a user to run the diagnostic software and/or restore the user system image.
Figure 8:
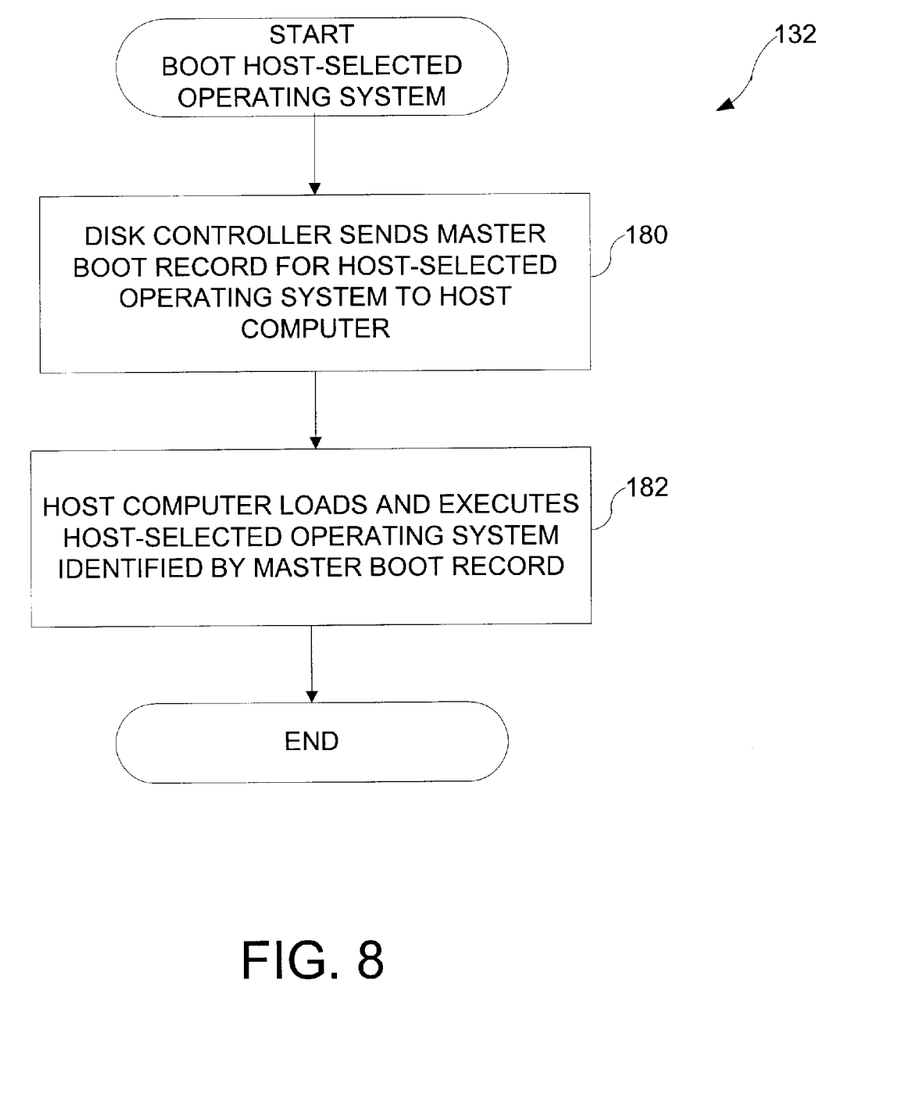
FIG. 8 is a flow diagram illustrating exemplary logic for loading and executing a host-selected operating system.

FIG. 4 is a flow chart illustrating exemplary logic for booting a computer having PC Services. When the user boots the computer, the host computer sends a boot command to the disk controller requesting a master boot record to read the host-selected operating system (step 120). This is the normal or typical boot procedure. Normally, the disk controller sends the master boot record identifying the host-selected operating system. Typically, there is an MBR located at cylinder 0, head 0, sector 1 of a hard disk. The MBR is first of what could be many partition sectors, each containing a partition table. The MBR contains a small program that attempts to locate an active (bootable) partition in its partition table. Each operating system has its own boot sector format. The small program in the boot sector locates the first part of the operating system's kernel loader program, the kernel itself, or a boot manager program. The located first part of the operating system's kernel (or the kernel itself or a boot manager program) is then read into memory. In other words, the host-selected or user preferred operating system is loaded and executed. However, in the present invention, the disk controller uses address spoofing as described in U.S. patent application Ser. No. 09/796,915 to send an alternate master boot record that allows the user to run PC Services (step 122). The master boot record loads and executes logic that causes the host processor to wait a predetermined period of time (e.g., five seconds) for a predetermined key sequence (e.g., <CTRL><ALT><F10>). A timer is set to the predetermined period of time (step 124). The host processor then waits for the predetermined period of time or until user input is received (step 126). If the predetermined key sequence for requesting PC services is received within the predetermined time period (yes in decision block 128), the PC Services logic is loaded and executed from the hidden partition (step 130). Exemplary logic for performing PC services in accordance with the present invention is shown in FIG. 5 and described below. If the timer expires, the host-selected operating system is loaded and executed, e.g., normal boot process continues (step 132) as shown in FIG. 8 and described later. It will be appreciated that the user may enter keystrokes other than those designated as invoking PC Services prior to the expiration of the timer. Such user input will be processed normally, e.g., ignored.

Figure 9A:
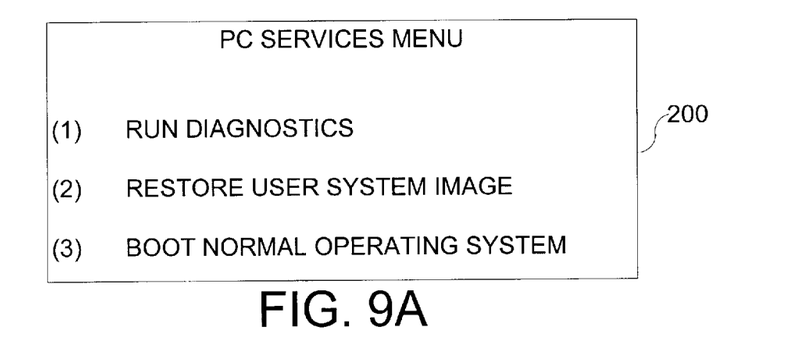
FIGS. 9A–9C illustrate exemplary PC Services menus.

FIG. 5 illustrates exemplary logic for loading and executing PC Services in accordance with the present invention. After the appropriate code is loaded, execution begins and a menu of PC Services is displayed (step 140). FIG. 9A illustrates an exemplary PC Services menu that allows the user to either: run diagnostics, restore the user system image; or boot to the normal (e.g., host-selected) operating system, for example, Windows® 95™, Windows ME®, etc. The user selects one of the available options. After the user input is received (step 142), appropriate logic is executed based on the user's input. If the user opts to run diagnostics (yes in decision block 144), diagnostics are run (step 146) as shown in FIG. 6 and described next.

Figure 6:
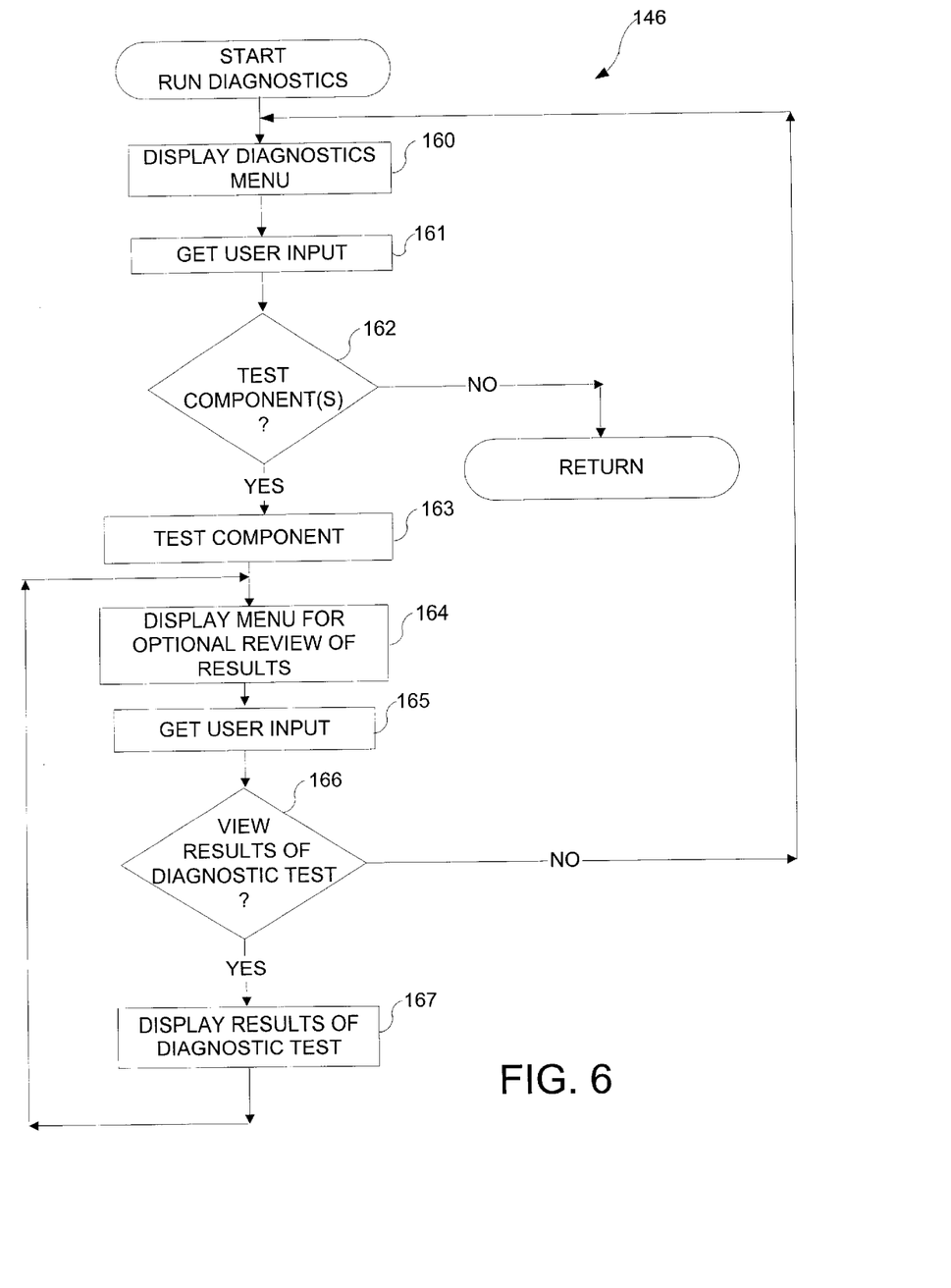
FIG. 6 is a flow diagram illustrating exemplary logic for running diagnostic software.
Figure 9B:
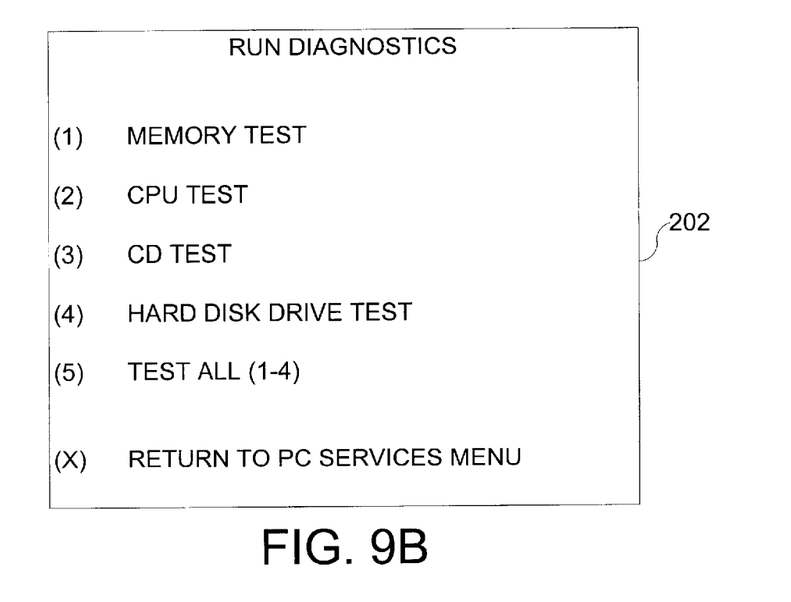
Figure 9C:
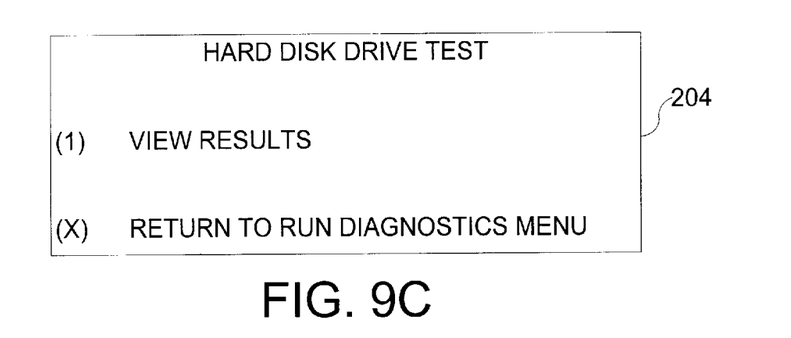

FIG. 6 is a flow diagram illustrating exemplary logic for running diagnostics. It will be appreciated that in order to run the diagnostics, an "operating system" may first be loaded and executed. A diagnostics menu, such as that shown in FIG. 9B is displayed (step 160). In exemplary embodiments, an off-the-shelf diagnostics product, such as PC Doctor™ is used. In the example menu illustrated in FIG. 9B, the user can run one of the specific tests (e.g., A5 memory test, central processing unit (CPU) test, hard disk drive test) or all tests. The user can also return to the previous (PC Services) menu shown in FIG. 9A. The user selects one of the menu options. The user input is received (step 161) and the appropriate logic is performed. If the user selects one of the diagnostic functions, e.g., run a specific test or run all tests (yes in decision block 162), the appropriate test(s) is run (step 163). In exemplary embodiments, after completion of a diagnostic test, a menu such as the one shown in FIG. 9C is displayed (step 164). If the user wishes to view results of the diagnostic test (yes in decision block 166), the diagnostic results are displayed (step 167). The user can also return to the diagnostics menu shown in FIG. 9B (no in decision block 166). The user may then run additional diagnostics if desired. When the user has performed the desired diagnostic test(s), the user returns to the main PC Services menu shown in FIG. 9A. The user can then restore the user system image or boot the host-selected operating system (e.g., continue with the normal boot process).

Figure 7:
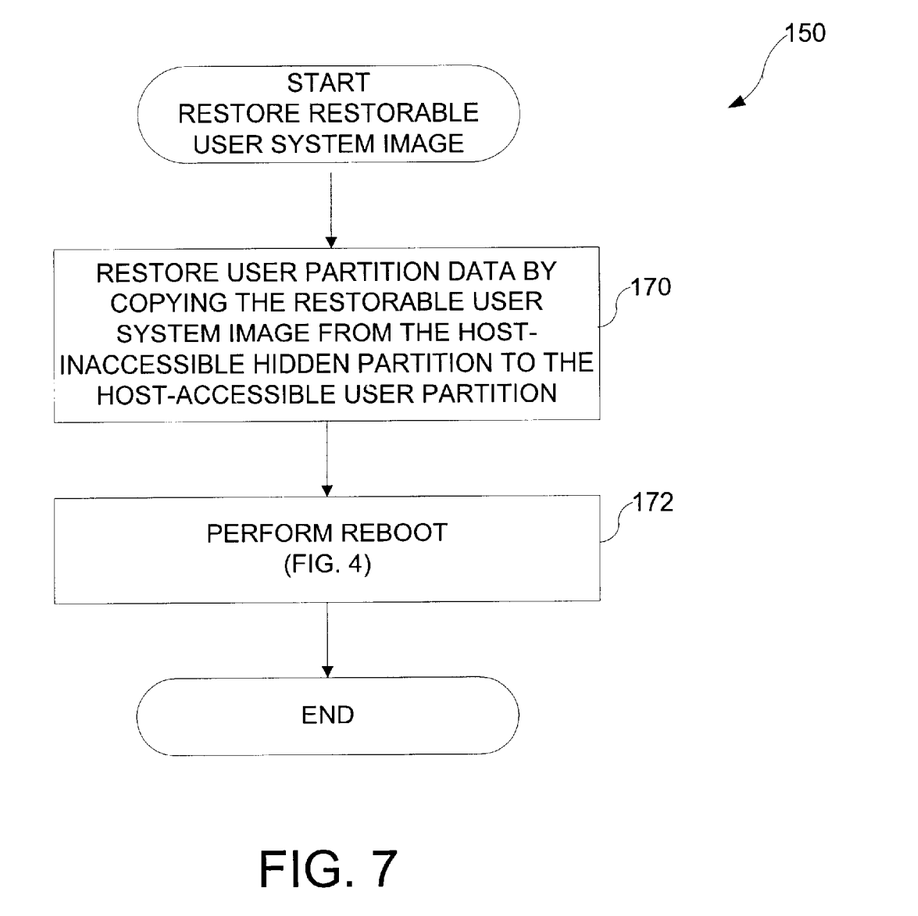
FIG. 7 is a flow diagram illustrating exemplary logic for restoring the user system image.

FIG. 7 illustrates exemplary logic for restoring a user system image. If the user initiates the restore user system image function, the user system image that includes the user preferred operating system and configuration data stored in the hidden partition, also known as a factory image, (FIG. 3) can be restored. In exemplary embodiments, user data is stored to create a restorable updated system image and the updated system image is restored. The user partition data is restored by copying the restorable user system image or the restorable updated system image from the host-inaccessible hidden partition to the host-accessible user partition (step 170). In exemplary embodiments, after the user system image is restored, the system is automatically rebooted (step 172) so that the restored host-selected operating system can be loaded and executed. The process of booting a system having system diagnostics and a restorable user system image in a hidden partition is illustrated in FIG. 4 and described above.

FIG. 8 illustrates exemplary logic for loading and executing the host-selected operating system (e.g., normal boot). The disk controller sends the master boot record for loading and executing the host-selected operating system to the host computer (step 180). The host computer loads and executes the host-selected operating system specified by the master boot record (step 182).

We claim:

1. A disk drive for use with a computer system including a host memory and a host processor for generating a boot command, the disk drive comprising:
   a. a host-accessible user partition including:
      i. a user partition address range;
      ii. a host-selected operating system stored within the user partition address range; and
      iii. a host-selected master boot record stored within the user partition address range, the host selected master boot record identifying the host-selected operating system;
   b. a host-inaccessible hidden partition independent of the host-accessible user partition and including:
      i. a hidden partition address range outside the user partition address range;
      ii. diagnostic software stored within the hidden partition address range, the diagnostic software configured to determine a condition of the computer system; and
      iii. a drive-selected master boot record stored within the hidden partition address range, the drive-selected master boot record for:
         (a) waiting for a user input within a predetermined time period;
         (b) if the user input is received within the predetermined time period:
            1. loading and executing the diagnostic software; and
         (c) if the user input is not received within the predetermined time period:
            1. loading the host-selected master boot record; and
            2. loading and executing the host-selected operating system identified by the host-selected master boot record; and
   c. a disk controller configured to receive the boot command and to send the drive-selected master boot record to the host memory in response to receipt of the boot command.

2. The disk drive of claim 1, wherein the host-inaccessible hidden partition further includes a drive-selected operating system within the hidden partition address range, the drive-selected operating system configured to load and execute the diagnostic software.

3. The disk drive of claim 2, wherein the drive-selected operating system is loaded into the host memory prior to loading and executing the diagnostic software.

4. The disk drive of claim 1, wherein the sending of the drive-selected master boot record to the host memory by the disk controller, in response to the boot command, is a default operation.

5. A computer system comprising:
   a. a disk drive including:
      i. a host-accessible user partition including:
         (1) a user partition address range;
         (2) a host-selected operating system stored within the user partition address range; and
         (3) a host-selected master boot record stored within the user partition address range, the host-selected master boot record identifying the host-selected operating system; and
      ii. a host-inaccessible hidden partition independent of the host-accessible user partition and including:
         (1) a hidden partition address range outside the user partition address range;
         (2) diagnostic software stored within the hidden partition address range, the diagnostic software configured to determine a condition of the computer system; and
         (3) a drive-selected master boot record stored within the hidden partition address range; and
   b. a host computer coupled to the disk drive and including:
      i. a host processor configured to generate a boot command to read the host-selected master boot record;
      ii. a host memory configured to load the drive-selected master boot record to define a loaded drive-selected master boot record, after the disk drive receives the boot command;
      iii. the host processor configured to execute the loaded drive-selected master boot record by:
         (1) waiting for a user input within a predetermined time period;
         (2) if the user input is received within the predetermined time period:
            (i) loading and executing the diagnostic software; and
         (3) if the user input is not received within the predetermined time period:
            (i) loading the host-selected master boot record; and
            (ii) loading and executing the host-selected operating system identified by the host-selected master boot record.

6. The computer system of claim 5, wherein the user input comprises a predefined set of keystrokes.

7. The computer system of claim 5, wherein the host-inaccessible hidden partition further includes a drive-selected operating system configured to load and execute the diagnostic software.

8. The computer system of claim 7, further comprising loading and executing the drive-selected operating system prior to loading and executing the diagnostic software.

9. The computer system of claim 5, wherein the host-accessible user partition further includes configuration data and the host-inaccessible hidden partition further includes a copy of the host-selected operating system and the configuration data to define a user system image.

10. The computer system of claim 9, wherein the user system image is copied to the host-accessible user partition based on the condition of the computer system determined by the execution of the diagnostic software.

11. The computer system of claim 9, wherein the host-accessible user partition further includes user data and the host inaccessible-hidden partition further includes a copy of the user data to define an updated user system image.

12. The computer system of claim 11, wherein the updated user system image is copied to the host-accessible user partition based on the condition of the computer system determined by the execution of the diagnostic software.

13. The computer system of claim 5, wherein the loading of the drive-selected master boot record, after the disk drive receives the boot command, is a default operation.

14. A computer system comprising:
   a. a host computer; and
   b. a disk drive coupled to the host computer, the disk drive comprising:
      (1) a host-accessible user partition including:
         (i) a user partition address range; and
         (ii) user partition data stored within the user partition address range, the user partition data comprising at least one host-selected operating system and configuration data; and
      (2) a host-inaccessible hidden partition independent of the host-accessible user partition and including:

(i) a hidden partition address range outside the user partition address range;

(ii) a drive-selected operating system stored within the user partition address range;

(iii) a drive-selected master boot record stored within the hidden partition address range, the drive-selected master boot record configured to load the drive-selected operating system; and (iv) restorable user partition data comprising a copy of the user partition data, the restorable user partition data configured to restore the user partition data.

15. The computer system of claim 14, wherein the host-inaccessible hidden partition further comprises diagnostic software configured to determine if the host-accessible user partition data should be restored.

16. A method of restoring a user system image on a disk drive for use with a computer system including a host processor for generating a boot command and a host memory, the method comprising:

a. loading user partition data comprising at least one host-selected operating system and configuration data on a host-accessible user partition of the disk drive; and b. loading a restorable user system image comprising the user partition data on a host-inaccessible hidden partition of the disk drive.

17. The method of claim 16, further comprising:

a. in response to the host processor generating a boot command to read a host-selected master boot record, accepting a user input to restore the user partition data; and b. restoring the user partition data by copying the restorable user system image from the host-inaccessible hidden partition to the host-accessible user partition.

18. The method of claim 17, further comprising executing diagnostic software to determine a condition of the computer system.

19. The method of claim 18, wherein the diagnostic software is stored in the host-inaccessible hidden partition.

20. The method of claim 18, wherein in response to the host processor generating a boot command to read a host-selected master boot record, a drive-selected master boot record in the host-inaccessible hidden partition is executed by the host processor to perform the steps of:

a. waiting for a user input within a predetermined time period;

b. if the user input is received within the predetermined time period:

i. loading and executing the diagnostic software; and c. if the user input is not received within the predetermined time period:

i. loading the host-selected master boot record; and ii. loading and executing the host-selected operating system identified by the host-selected master boot record.

21. The method of claim 20, further comprising loading and executing an operating system prior to loading and executing the diagnostic software.

22. The method of claim 21, wherein the operating system is a drive-selected operating system.

* * * * *